April 27, 1943. G. P. STOUT 2,317,559
METHOD OF DETECTING FOREIGN INGREDIENTS IN CLOSED CONTAINERS
Filed Sept. 10, 1941 4 Sheets-Sheet 1

Inventor
George Philip Stout.
By F. Wilson Corder
Attorney

April 27, 1943.   G. P. STOUT   2,317,559
METHOD OF DETECTING FOREIGN INGREDIENTS IN CLOSED CONTAINERS
Filed Sept. 10, 1941   4 Sheets-Sheet 3
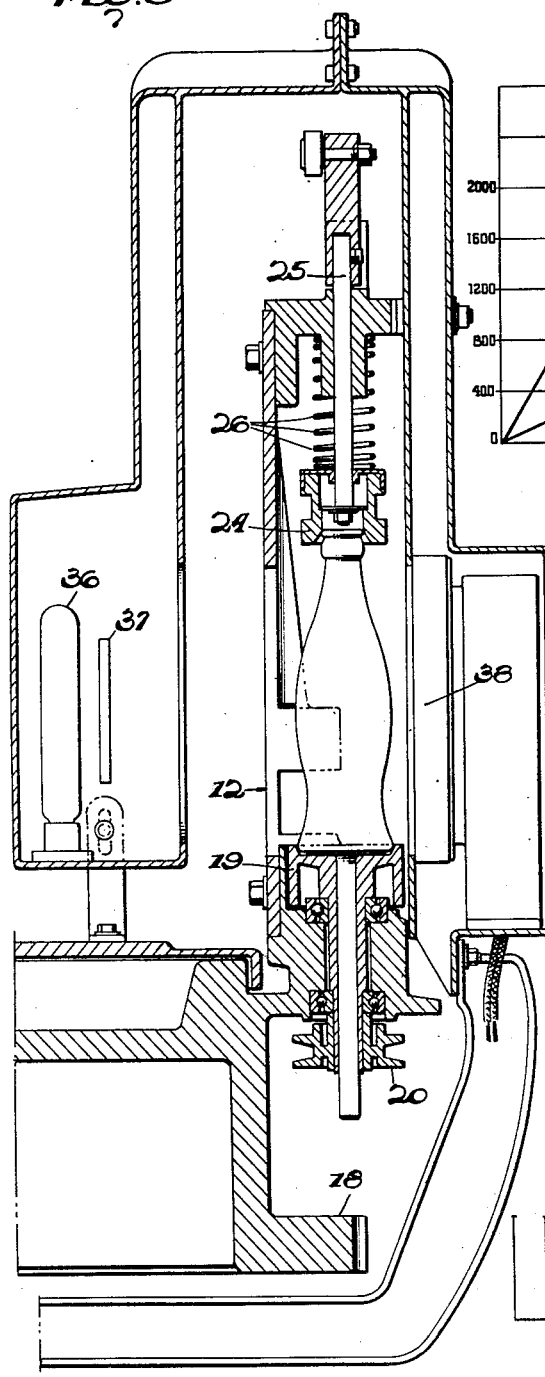
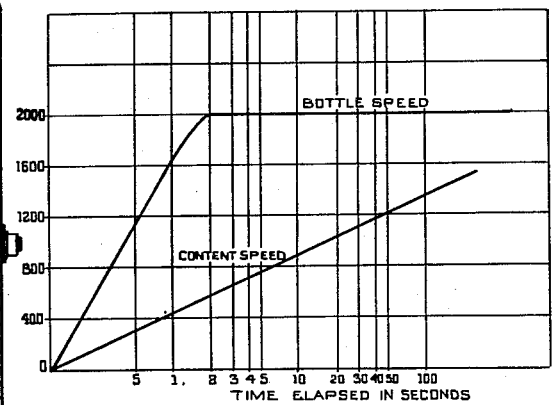
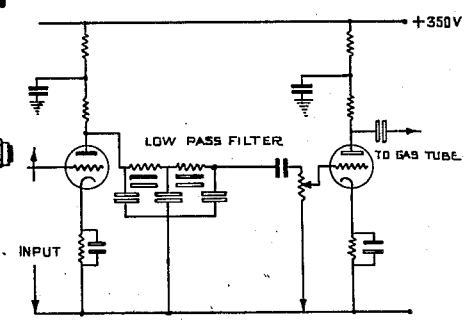
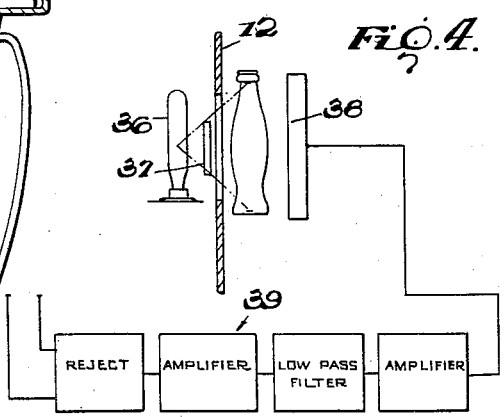
Inventor
George Philip Stout.
By R. Wilson Corder
Attorney April 27, 1943.    G. P. STOUT    2,317,559
METHOD OF DETECTING FOREIGN INGREDIENTS IN CLOSED CONTAINERS
Filed Sept. 10, 1941    4 Sheets-Sheet 4
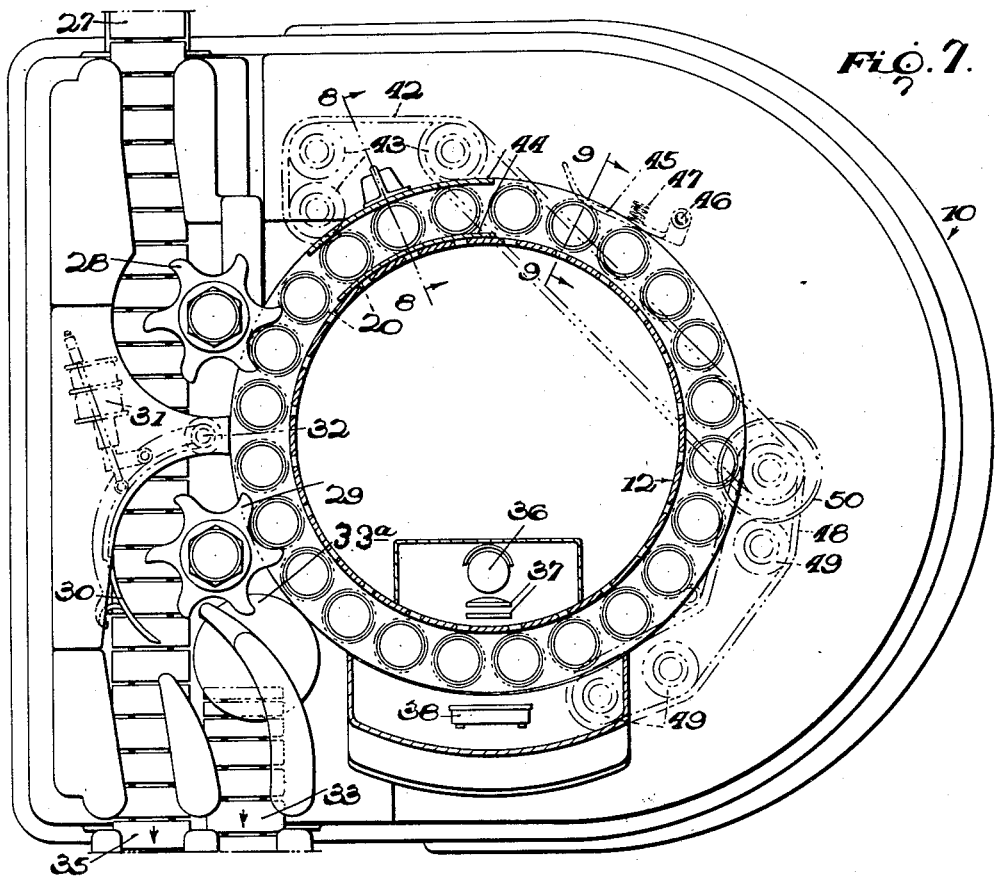
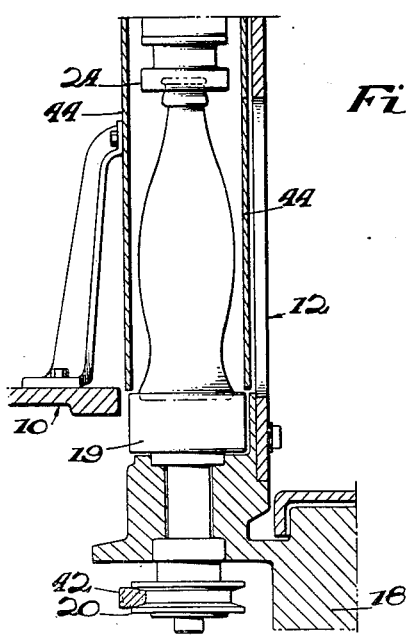
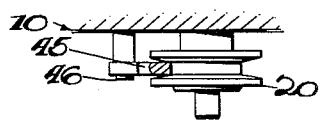
Inventor
George Philip Stout.
Attorney Patented Apr. 27, 1943

2,317,559

UNITED STATES PATENT OFFICE 2,317,559

METHOD OF DETECTING FOREIGN INGREDIENTS IN CLOSED CONTAINERS

George Philip Stout, Baltimore County, Md., assignor to The Coca-Cola Company, Wilmington, Del., a corporation of Delaware Application September 10, 1941, Serial No. 410,315

7 Claims. (Cl. 209—111)

This invention relates to inspection devices, and more particularly to a new and improved method of detecting foreign ingredients in closed containers.

In my basic Patent No. 2,132,447 I taught the detecting of such particles in bottled beverages by passing a beam of radiant energy through the contents of such containers while said contents were rapidly rotating, the bottles themselves being abruptly stopped immediately before the inspection process, any interruption in said beam of light being picked up by a photoelectric cell and greatly amplified, the force thus created then being used to cause a reject of the bottle containing the undesirable substance. This system, while generally satisfactory, has certain drawbacks, as for example, a mechanical brake is required to stop the bottles from rotating and inspection is sometimes complicated by the fact that the sudden stopping of the bottle tends to disturb the vortex created in its liquid contents by the aforementioned perpendicular rotation, such disturbance sometimes resulting in false rejects.

It has also been found that in certain bottling plants an inadequate mixing of the syrup with the carbonated water results in an unbalanced condition of the beverage at the time of inspection, this lack of uniformity setting up essentially the same conditions as those existing when a foreign ingredient is present and resulting in bottles being thrown out which are unobjectionable except that mixing of their contents is not 100% perfect.

Again, bottles tend to get a greater or lesser amount of water on them during the bottling process, as for example, a certain amount adheres as the result of rinsing in the soaker during the last stage of cleaning, or a certain amount of water may come from the filling process as by leaking around the seal of the bell putting carbonated water into the bottle. Occasionally, the bottle foams over and some of its contents adhere to its outside. It will also be noted that as bottles come from soakers they are relatively warm, and a lower temperature in the bottling room plus the presence of abnormal moisture there, as for example that permeating the air from the steam and water used in the soaker or soakers, results in appreciable condensation on the outside of the containers, they often achieving a frosted appearance. All of these conditions present problems of inspection, particularly when due to the rotation of the containers a sort of "rain" is created in front of the photocell equipment, upon which a tendency to false rejects arises and continues until this condition is corrected. This problem is particularly acute in plants using what is known as a "Dixie" machine where all bottles delivered are practically covered with water.

An object of the present invention is to provide a method of and apparatus for inspecting bottled beverages through what might be called a tuned circuit, thereby eliminating variations in sensitivity due to irregular configuration of containers.

A further object is to make possible inspection of the instant type without the employment of a mechanical brake to stop the bottles from rotating.

Another object is to facilitate inspection by maintaining a symmetrical vortex in the liquid contents of containers.

A still further object is to provide a method of and means for improving the mix of the liquid contents of beverage containers, thereby insuring more satisfactory inspection results.

Another object is to make possible automatic drying of bottles before inspection, thereby reducing false rejects caused by excess moisture at the point where the bottle comes into proximity with photocell equipment.

Another object is to provide simplicity and economy of operation in a device of the instant type.

These and other objects are made apparent in the present specification, a full and complete understanding of which is facilitated by reference to the drawings herein in which:

Fig. 3 is an enlarged side view of that portion of the instant device housing the optics, a bottle being illustrated in the process of inspection;

Fig. 4 is a substantially diagrammatic view illustrating the optical and certain electrical parts of the instant system;

Fig. 5 is a wiring diagram illustrating a filter and amplifier arrangement embodying my invention;

Fig. 6 is a chart illustrating the relative difference between bottle rotation speed and speed of contents at progressive time periods;

Fig. 7 is a top view of a structure substantially identical with that shown in Fig. 2 except that special means for mixing and drying have been provided;

Fig. 8 is an enlarged fragmentary side view, partially in vertical cross-section, taken along the line 8—8 of Fig. 7 looking in the direction of the arrows; and Fig. 9 is an enlarged fragmentary view of certain brake structure taken along the line 9—9 of said Fig. 7 and looking in the direction of the arrows.

Figure 1:
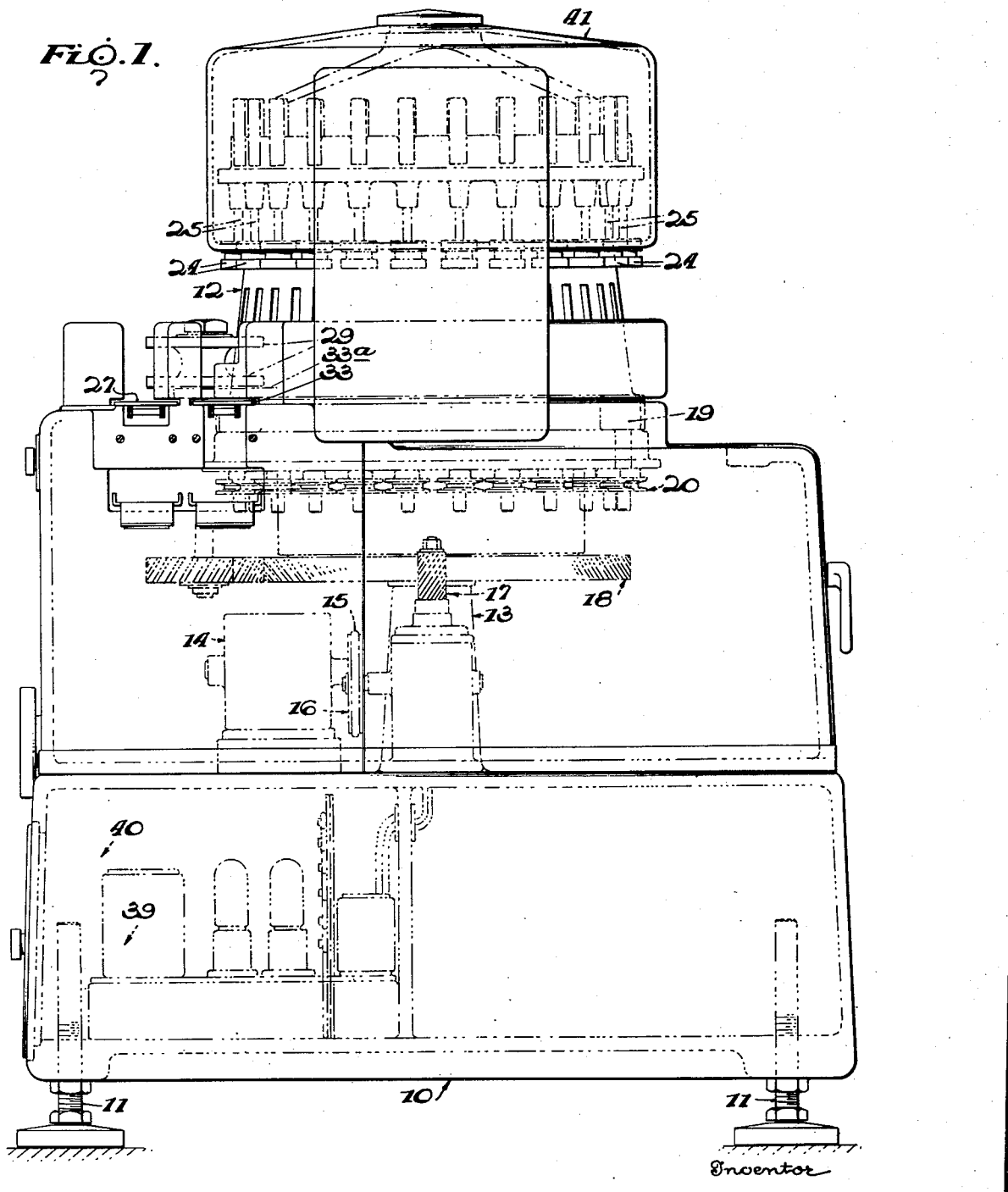
Fig. 1 is a side elevational view showing a complete beverage inspection device embodying my invention.
Figure 2:
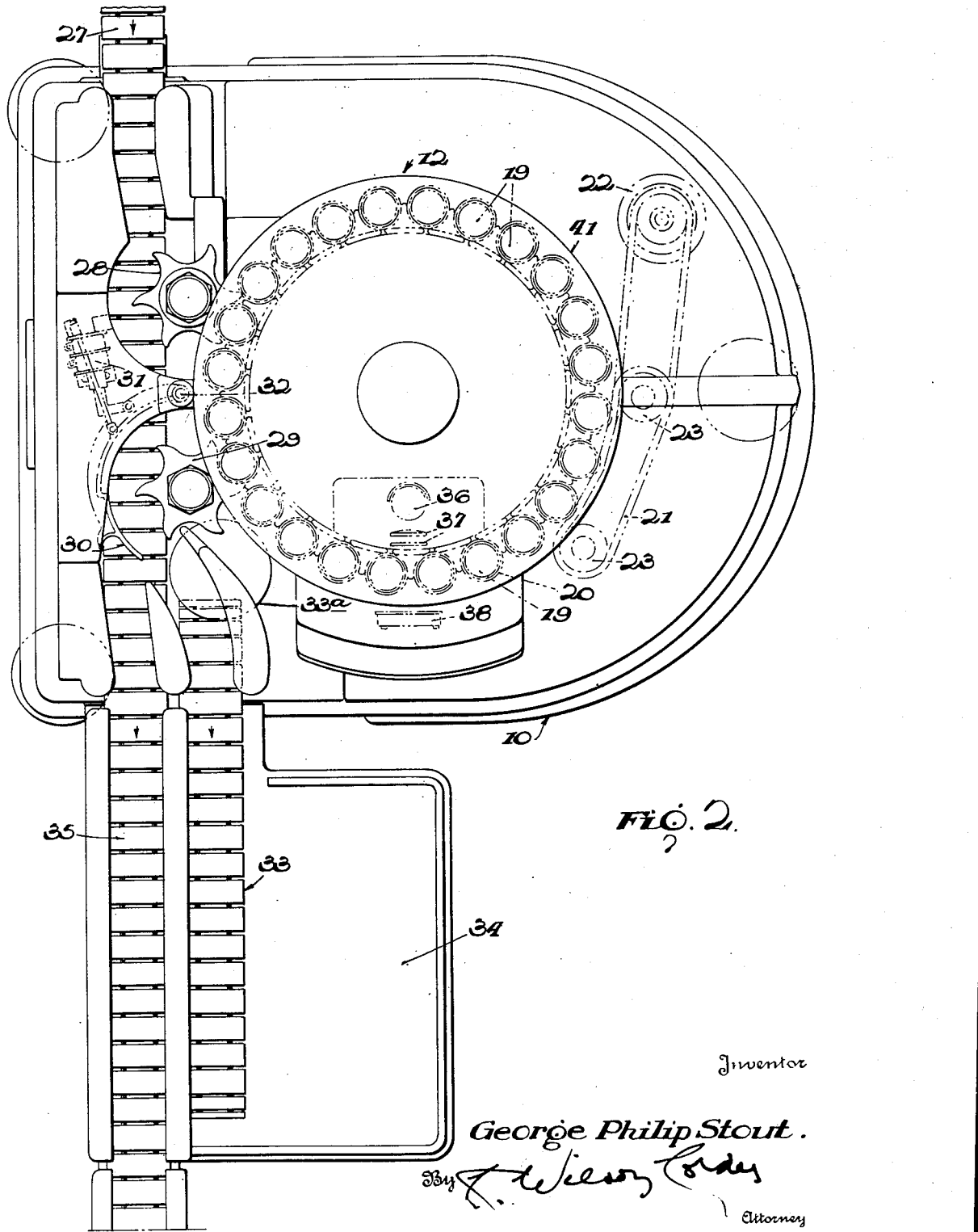
Fig. 2 is a top plan view of the structure illustrated in Fig. 1, certain covering elements being removed for the sake of clearness.

Referring now to the drawings it will be seen that my device comprises a base and supporting structure 10 provided with adjustable legs 11. A turret-like member 12 is rotated about a base 13 by means of a motor or other source of power 14 operating through belt 15 to drive pulley 16 which in turn through a conventional intermediate gear assembly drives pinion 17, the teeth of which engage and cause to revolve a large gear 18 which in effect constitutes the lower peripheral edge of turret 12 and is fixedly mounted thereto. Said turret is provided with a series of rotable bottle-receiving cups 19 (Fig. 2), the under portion of which carry pulleys 20 contemplated to engage driving belts 21 and thereby cause bottles to be rotated about their perpendicular axes. Belts 21 may be actuated by a second motor 22, idler and guide pulleys 23 serving to maintain said belts in such position that when elements 20 are brought into engagement therewith by virtue of the rotation of turret 12 the bottle-receiving cup members are quickly stepped up to a desired R. P. M.

At a stated interval above each bottle-receiving cup and in perpendicular alinement therewith is a neck or top-engaging element 24 (Fig. 3), same being free to rotate with or on shaft 25 and held against the tension of spring 26, a cam-like guide member automatically raising element 24 at the point each bottle enters the turret, upon which said guide member ceases to be effective and the bottle is firmly maintained in position through the tension of spring 26 and associated elements. Another and similar guide raises said top member as the bottle leaves the machine, thereby permitting it to continue its forward movement uninterrupted.

A conveyor 27 brings bottles to the machine, an infeed star wheel 28 governing this operation, and an outfeed star wheel 29 serving the opposite function on the other side of the device. A reject arm 30 is held in inoperative position by means of solenoid 31, spring means at pivot point 32 causing said arm to swing into the reject position shown in Fig. 2 upon said solenoid's becoming deenergized, and a reject conveyor 33, which is associated with a revolving disc 33a, leads to an accumulation table 34 where bottles which have been thrown out may be picked up and suitably disposed of. Normally, bottles proceed along outfeed conveyor 35 in their progress towards channels of trade.

An optical system including a source of radiant energy such as a bulb 36 is associated with turret 12 and through cam means synchronized with the forward movement of bottles in said turret, whereby during the inspection period both the optics and the bottle are travelling together. Suitable lenses, suggested at 37 (Fig. 2), serve to focus the beam of light upon a photoelectric cell 38, any selected impulse emanating therefrom being amplified and employed to cause a reject as by de-energizing the solenoid at the time the bottle containing the foreign substance is about to leave the machine, this resulting in such bottles' being by-passed to the reject table as set forth above.

The amplifier 39, switch relays, et cetera may be housed in the lower portion 40 of supporting member 10. A suitable cover such as 41, which preferably is made of stainless steel, completes the appearance of the upper portion of the turret and serves as a safety factor in enclosing the moving parts contained in the upper section of the turret.

Coming now to the more important features of the instant invention, it being understood that the structure set forth is largely for illustrative purposes, it will be noted that in my proposed new system the bottle is rotated very quickly, and at a selected time inspected, the amplifier being able to differentiate between the disturbance caused by the bottle itself and that which would be caused by any foreign particle revolving therein at a substantially lower speed. In this connection, reference is made to Fig. 6, which chart illustrates the action of a bottle rotated very quickly up to approximately 2,000 R. P. M., which may be done in about 2 seconds, after which the bottle speed levels off and remains constant. The liquid in the container, however, cannot follow the speed of the bottle and must start at rest and very slowly reach such speed, it having been found by experiment that this actually requires several minutes. Now, if there is selected a period of time of say 3 seconds after the bottle has been rotated, the contents will be revolving at approximately 600 R. P. M. while the bottle itself is, as previously stated, revolving at 2,000 R. P. M. A disturbance or impulse caused by this rotation would be a function of the speed, size and shape of the distortion. In the bottle a single surface irregularity would cause to be generated a certain minimum frequency. A series of high points would cause much higher frequency, and thus it will be seen that there is a certain horizontal frequency below which there is no disturbance from the bottle, which frequency for the sake of illustration we will say to be 300 cycles per second.

The same physical phenomenon is true regarding a foreign particle in the liquid contents of the bottle, but since the speed of said contents is approximately ⅓ of that of the container, its family of frequencies is much lower than those generated by the bottle. My fundamental inventive thought lies in using an amplifier incorporating a low-pass filter to eliminate frequencies that are not wanted but passing frequencies that are caused by the contents of the bottle, these being used to cause rejects.

An understanding of the instant case will be facilitated by the following explanation of the principles involved. It is well known that for any revolving generator of electricity, the frequency is a function of the speed and the shape and number of poles of the revolving elements. One of the best examples of this is the tone wheel used by the Hammond Instrument Company in the Hammond organ, this comprising a shaft on the end of which is an element resembling a gear placed in juxtaposition to a coil encircling a magnetized iron bar so as to produce a "pick up coil," the frequency produced being determined by the speed of rotation of the shaft and the number of high spots passing the magnet per second. If we assume such a tone wheel having a complex arrangement of possibly a dozen discs in laminated form ranging in design from one to twelve "high spots" for the various discs and the assembly driven at constant speed, then the frequencies produced would be in the ratio of 1: 2: 3:-12. The lowest frequency produced will be that coming from the tone wheel having the single high spot.

Outside of a specific disturbance generally known as "difference frequencies," which can be eliminated by suitable filters, the frequency band of this arrangement will be entirely clean below a certain value (as fixed by the speed of the disc with the single high spot). This is the same conditon which exists in a bottle having a series of ribs on its exterior when light is passed through the container longitudinally and same is rotated about its perpendicular axis. It will be noted, however, that by quickly bringing the bottle up to a speed of 2,000 R. P. M., the contents do not follow the quick acceleration of the container and can only approach the 2,000 R. P. M. as a limit after considerable lapse of time. From the chart, Fig. 6, it will be seen that while the bottle is brought up to speed in two seconds, the contents at this time are only revolving at about 25% to 30% of that speed, this being due to the fact that there is only a frictional drag to accelerate the liquid. At the end of three seconds the bottle speed has leveled off at 2,000 R. P. M. while the contents are revolving at about 600 R. P. M., and the frequency produced by any foreign particle swirling with the contents at the 600 R. P. M. level will cause a disturbance equivalent to that speed, this being comparable in the example given above to a single high spot on a tone wheel. This frequency is fairly constant regardless of the size and shape of the foreign particle.

By incorporating a low-press filter in the amplifier, as indicated in Figs. 4 and 5, frequencies below a certain predetermined value are passed through the amplifier, but all those above this value are absorbed in the filter, this threshhold value being determined by finding the point where interference begins.

Hence it is apparent that by adopting an arrangement and method of inspection along the foregoing lines, it is possible to inspect the contents of containers without bringing the outside thereof to an absolute stop through the means of a mechanical brake as taught in my prior patent, the impulses set up by the outside of the container being in effect ignored, whereas those of a lower frequency generated by a foreign particle in the liquid contents are passed through and employed to initiate the desired result, that of throwing out those bottles in which objectionable material is present.

Aside from elimination of parts, this system is particularly desirable in that it eliminates the disturbance to the vortex formed at and near the top of the fluid contents of a revolving container when such is suddenly stopped, there being an upward surge or movement in such a case along with a tendency for the vortex to "whip," which tends to upset the smooth functioning of the delicate reject mechanism. Aside from this, greater efficiency in surface inspection is made possible since foreign particles of a light nature, such as cork for example, will be drawn down into the smoothly whirling vortex and readily detected, whereas in the presence of a disturbance brought about by the abrupt stopping of the outside of the container such a result does not always accrue, such light particles then tending to jump to the upper surface and possibly escape detection.

Another advantage of the instant setup is that since the space required for the spinning and stopping of bottles is not nearly as great as that required under the old brake system, it is possible to make the instant machines considerably smaller, saving in material in this manner representing an obvious benefit.

Further evidence of the utility of the instant invention resides in the fact that in inspecting bottles with irregular side wall thicknesses, as for example containers with flutes or ribs on the outside thereof, a variation in inspection sensitivity is always present under a method requiring the container to be stopped at the time of inspection. That is, one bottle may be subjected to the light's rays at a point where its side walls are at a maximum thickness, whereas the next bottle in line may be stopped in such a position that a minimum of resistance to the passage of light is present. In the latter case appreciably more sensitivity exists than in the former, which means that bottles containing foreign material may be rejected in one case and passed in the other. The figuration on the surface of certain bottles tends to cause a variation of threshold of inspection which at times mounts as high as three to one, which lack of uniformity of result is obviously objectionable and is overcome by my invention in which a uniform sensitivity exists at all times, the speed of rotation of the containers during the inspection process tending in effect to make the walls of the bottles of one thickness, the instant process averaging out the variation mentioned above.

Attention is now directed to the modification suggested in Figs. 7, 8 and 9 whereby bottles are initially spun very rapidly, brought to a complete stop and then accorded a normal rotation during their progress through the inspecting system. This may be accomplished through belt 42 which operates on idler pulleys 43 in such a manner as to engage driving pulleys 20 (Fig. 8) and give the bottles an initial spin of say 1½ times that of the regular spinning system, or roughly 2,200 R. P. M. A conveniently located baffle 44 is employed to collect the water thrown off the bottles, and an automatic brake consisting of an arm 45 pivoted at 46 and operating against the tension of spring 47 then serves to bring the bottles to a stop before they engage belt 48 operating on idlers 49 and driven by motor 50, which motor is likewise employed to initially power belt 42.

This system serves to better mix the contents of the containers and thus reduce false rejects, and at the same time removes moisture from the exterior of the bottles, it having been found that inspection is not particularly satisfactory in the presence of excess water, same causing drive belts to operate poorly, reducing the effectiveness of any brake, tending to damage the bearings, making the bottles slip in the cups, making it difficult to keep the windows clean through which is directed the beam of radiant energy during inspection, and worst of all, causing a sort of "rain" in front of the photo cell equipment which naturally tends to result in rejections.

Extensive experimentation has shown that there is a gradient in centrifugal drying of wet bottles, a drop of water at any particular point being removed as the speed of rotation exceeds a certain value, the location of the droplets of water determining this critical speed. For example, certain drops will remain on the bottle at 1,200 R. P. M.—a desirable inspection speed—whereas said same drops would have been removed if they had encountered a speed of 2,000 R. P. M. Hence the desirability of first subjecting the container to this higher speed before entering upon the actual inspection process is at once evident.

From the foregoing it will be apparent that I have disclosed a new and improved method of and apparatus for the inspection of bottled liquids which in its composite form represents advantages and improvements, the nature and extent of which it is believed have been adequately pointed out heretofore. While I have disclosed and described certain structure and procedure herein, I do not intend to limit myself thereby, but on the contrary, the appended claims are to be given an interpretation, construction and scope fairly commensurate with my contribution to the art.

I claim:

1. The method of inspecting bottled beverages for the purpose of locating foreign ingredients therein, which consists of rapidly rotating the bottles in which said fluids are contained, passing a beam of radiant energy through said contents at a time when the rate of revolution thereof is appreciably under the speed of rotation of the outside of the container, and amplifying the impulse caused by the interruption in said beam of energy caused by the movement of a foreign particle into or out of same to effect a rejection of a bottle containing a foreign particle, said amplification to be so tuned as to disregard impulses having relatively high frequencies and set up by the movement of the outside of said bottles.

2. The method of inspecting bottled beverages for the purpose of locating foreign ingredients therein, which consists of rotating the bottles in which said fluids are contained, passing a beam of radiant energy through said contents at a time when the rate of revolution thereof is under the speed of rotation of the outside of the container, and amplifying the impulse caused by the interruption in said beam of energy caused by the movement of a foreign particle into or out of same to effect a rejection of a bottle containing a foreign particle, said amplification to be so tuned as to disregard impulses having relatively high frequencies and set up by the movement of the outside of said bottles.

3. The method of inspecting bottled beverages for the purpose of locating foreign ingredients therein, which consists of rotating the bottles in which said fluids are contained, passing a beam of radiant energy through said contents at a time when the rate of revolution thereof is less than the speed of rotation of the outside of the container, and amplifying the impulse caused by the interruption in said beam of energy caused by the movement of a foreign particle into or out of same to effect a rejection of a bottle containing a foreign particle, said amplification to be so tuned as to disregard impulses having relatively high frequencies and set up by the movement of the outside of said bottles.

4. The method of inspecting bottled beverages for the purpose of locating foreign ingredients therein, which consists of rapidly rotating the bottles in which said fluids are contained, passing a beam of radiant energy through said contents at a time when the rate of revolution thereof is appreciably under the speed of rotation of the outside of the container, and amplifying the impulse caused by the interruption in said beam of energy caused by the movement of a foreign particle into or out of same to effect a rejection of a bottle containing a foreign particle, said amplification being such as to disregard impulses having relatively high frequencies and set up by the movement of the outside of said bottles and any ornamentation thereon.

5. The method of inspecting bottled beverages for the purpose of locating foreign ingredients therein, which consists of rapidly rotating the bottles in which said fluids are contained, passing radiant energy through said contents at a time when the rate of revolution thereof is appreciably under the speed of rotation of the outside of the container, and amplifying the impulse caused by the interruption in said energy caused by the movement of a foreign particle into or out of same to effect a rejection of a bottle containing a foreign particle, said amplification to be so tuned as to disregard impulses having relatively high frequencies and set up by the movement of the outside of said bottles.

6. The method of inspecting bottled beverages for the purpose of locating foreign ingredients therein, which consists of rapidly rotating the bottles in which said fluids are contained, passing radiant energy through said contents at a time when the rate of revolution thereof is appreciably under the speed of rotation of the outside of the container, and amplifying the impulse caused by the interruption in said energy caused by the movement of a foreign element into or out of same to effect a rejection of a bottle containing a foreign particle, said amplification being so tuned as to not pick up impulses having relatively high frequencies and set up by the movement of the outside of said bottles.

7. The method of inspecting bottled beverages for the purpose of locating foreign ingredients therein, which consists of rapidly rotating the bottles in which said fluids are contained, passing a beam of radiant energy through said contents at a time when the rate of revolution thereof is appreciably under the speed of rotation of the outside of the container, and amplifying the impulse caused by the interruption in said beam of energy caused by the movement of a foreign particle into or out of same to effect a rejection of a bottle containing a foreign particle, said amplification being so tuned as to disregard impulses having relatively high frequencies.

GEORGE PHILIP STOUT.